United States Patent
Bihannic et al.

(10) Patent No.: US 11,016,818 B2
(45) Date of Patent: May 25, 2021

(54) METHOD OF ALLOCATING EXECUTION RESOURCES

(71) Applicant: ORANGE, Paris (FR)

(72) Inventors: Nicolas Bihannic, Trebeurden (FR); Pascal Rousset, Lannion (FR); Irene Grosclaude, Perros Guirec (FR)

(73) Assignee: ORANGE, Paris (FR)

( * ) Notice: Subject to any disclaimer, the term of this patent is extended or adjusted under 35 U.S.C. 154(b) by 226 days.

(21) Appl. No.: 16/064,339

(22) PCT Filed: Dec. 19, 2016

(86) PCT No.: PCT/FR2016/053553
§ 371 (c)(1),
(2) Date: Jun. 20, 2018

(87) PCT Pub. No.: WO2017/109367
PCT Pub. Date: Jun. 29, 2017

(65) Prior Publication Data
US 2018/0373571 A1    Dec. 27, 2018

(30) Foreign Application Priority Data
Dec. 21, 2015 (FR) ..................... 1562999

(51) Int. Cl.
*G06F 9/50* (2006.01)
*G06F 9/54* (2006.01)
(Continued)

(52) U.S. Cl.
CPC ........ *G06F 9/5077* (2013.01); *G06F 9/45558* (2013.01); *G06F 9/5061* (2013.01);
(Continued)

(58) Field of Classification Search
CPC ..................................... G06F 9/505
See application file for complete search history.

(56) References Cited

U.S. PATENT DOCUMENTS

2013/0304923 A1   11/2013   Clay et al.
2014/0089510 A1   3/2014   Hao et al.
(Continued)

OTHER PUBLICATIONS

International Search Report dated Apr. 4, 2017, for corresponding International Application No. PCT/FR2016/053553 filed on Dec. 19, 2016.
(Continued)

*Primary Examiner* — Brian W Wathen
(74) *Attorney, Agent, or Firm* — David D. Brush; Westman, Champlin & Koehler, P.A.

(57) ABSTRACT

A method of allocating execution resources, by a virtualized-resources manager entity, for an execution of an application service and of at least one network service. The execution of the application service depends on the concurrent execution of the at least one network service. the method includes: a first request to allocate execution resources by a manager entity of the at least one network service to the virtualized-resources manager entity; a second request to allocate execution resources by a manager entity of the application service to the virtualized-resources manager entity; and, prior to the requests, a notification, by the manager entity of the application service, of consumption forecast by the application service of at least one network service provided by the network services manager entity, to the services-managing network entity.

11 Claims, 2 Drawing Sheets

(51) Int. Cl.
  *G06F 9/455* (2018.01)
  *H04L 12/24* (2006.01)
  *H04L 12/911* (2013.01)

(52) U.S. Cl.
  CPC ............... *G06F 9/54* (2013.01); *G06F 9/546* (2013.01); *H04L 41/50* (2013.01); *H04L 47/781* (2013.01); *H04L 47/823* (2013.01); *G06F 2009/45583* (2013.01); *G06F 2209/5014* (2013.01)

(56) References Cited

U.S. PATENT DOCUMENTS

| | | | |
|---|---|---|---|
| 2014/0282528 A1 | 9/2014 | Bugenhagen | |
| 2015/0358248 A1* | 12/2015 | Saha | H04L 47/70 709/226 |
| 2016/0057075 A1* | 2/2016 | Parikh | H04L 47/788 709/226 |

OTHER PUBLICATIONS

Written Opinion of the International Searching Authority dated Apr. 4, 2017, for corresponding International Application No. PCT/FR2016/053553 filed on Dec. 19, 2016.
English translation of the Written Opinion of the International Searching Authority dated Apr. 4, 2017, for corresponding International Application No. PCT/FR2016/053553 filed on Dec. 19, 2016.
"Mobile Edge Computing." Introductory Technical White Paper, Issue 1. Sep. 2014.

* cited by examiner

METHOD OF ALLOCATING EXECUTION RESOURCES

CROSS-REFERENCE TO RELATED APPLICATIONS

This Application is a Section 371 National Stage Application of International Application No. PCT/FR2016/053553, filed Dec. 19, 2016, the content of which is incorporated herein by reference in its entirety, and published as WO 2017/109367 on Jun. 29, 2017, not in English.

FIELD OF THE DISCLOSURE

The invention lies in the field of telecommunication networks, and relates more particularly to a method for allocating execution resources within a virtualized resource infrastructure like a cloud infrastructure.

BACKGROUND OF THE DISCLOSURE

The ETSI (European Telecommunications Standards Institute) standardization organization launched, at the beginning of 2013, a project called NFV (Network Functions Virtualization) to establish, between the experts of the telecommunications and information technologies sectors, the first specifications in the field of virtualization (that is to say dematerialization) of the functions used in the telecommunications networks, hereinafter referred to as virtualized network functions (VNF). These virtualized network functions denote, for example, the functions implemented by a virtualized mobility management entity (e.g. MME), a gateway (e.g. P-GW, for "PDN Gateway"), a firewall, etc. Together, the virtualized network functions form network services corresponding, for example, to an IMS (IP Multimedia Subsystem) core network, a content distribution network (CDN), or even an EPC (Evolved Packet Core) network core. The virtualization of the network functions is implemented in particular on so-called cloud infrastructures, which implement and host these functions on virtual machines that are accessible, for example, via a network application. These virtual machines use remote hardware computing and network resources (e.g. network connectivity, computation power, storage spaces, servers, applications, etc.), managed by the cloud infrastructure, and pooled between its various clients as a function of their respective needs. The clients can thus access these resources without having to administer the underlying infrastructure managing these resources, which is often complex. The resource requests are made either network service by network service, or network function by network function.

The ETSI has also introduced, in a white book entitled "Mobile-Edge Computing—Introductory Technical White Paper" dated 18 Sep. 2014, a cloud infrastructure called MEC for "Mobile Edge Computing". An MEC infrastructure is made up of data centers (Datacenters) distributed closer to the access points of an operator network (PoP for "Point of Presence"). Such an MEC infrastructure allows for a better response to the evolution of the mobile network services. The mobile communications field indeed requires the capacity to process a significant traffic volume with a low latency, something a conventional infrastructure relying on highly centralized data centers does not make it possible to optimally address. An MEC infrastructure thus allows a low latency and can be used to perform pre-processing operations relating to an application service in a decentralized manner, then relaying only the useful information deriving from these pre-processing operations to a centralized data center charged with offering the application service; this allows for a large volume of data to be processed.

This MEC infrastructure does however present drawbacks given an environment that is constrained in terms of resources (e.g. computation and storage capacity, bandwidth) available at the decentralized data centers. The closer location of the points of access to a network does not in fact allow these decentralized data centers to have a significant volume of resources. This limitation on the resources can in particular lead to a shortage of resources when several client entities of such a cloud infrastructure simultaneously request an allocation of resources for the processing of their respective services.

As an example, it is possible to consider the case of an electricity consumption reading application service of an electricity provider depending on network services for the reading of electricity meters provided with sensors capable of connecting to a network of a telecommunications operator. In the example considered, the connection to the operator network is initiated by the sensors. The telecommunications operator uses the execution resources of an MEC cloud infrastructure for the execution of mobile functions such as the identification and the authentication of the sensors (provided for example with SIM—Subscriber Identity Module—cards), the attachment of the sensors to the network, the routing of the data transmitted by the sensors to an entity of the electricity provider. The electricity provider also uses the execution resources of the MEC cloud infrastructure for its own account in order to process the data obtained by means of the sensors.

In the absence of cooperation between the electricity provider and the telecommunications operator, the limitation on the available execution resources is likely to disrupt the operation of the electricity consumption reading service as well as the network services. Indeed, when the sensors of a given geographic area attach to the network and transmit their data, there follows an increase in the volume of execution resources allocated to the network services. If the number of connections remains greater than the number of disconnections, the volume of execution resources allocated for the processing of the network services increases. The data from the sensors are transmitted to the electricity consumption reading service of the electricity provider as and when they are obtained. When there is a sufficient quantity thereof, the electricity consumption reading service in turn asks the MEC cloud infrastructure for execution resources in order to process them. The latter responds for example to this request by allocating its last execution resources for the electricity consumption reading service. Since all of the execution resources of the MEC cloud infrastructure are being used by the consumption reading service and by the network services for the sensors already connected, it is then no longer possible to connect new sensors to the network. The electricity consumption reading service can no longer be provided optimally.

SUMMARY

One of the aims of the invention is to remedy the inadequacies/drawbacks of the prior art and/or to provide improvements thereto.

According to a first aspect, the invention relates to a method for allocating execution resources, by a virtualized-resources manager entity, for an execution of an application service and of at least one network service, the execution of the application service depending on the concurrent execution of said at least one network service. The method comprises:
- a first request for allocation of execution resources by a manager entity of said at least one network service to the virtualized-resources manager entity;
- a second request for allocation of execution resources by a manager entity of the application service to the virtualized-resources manager entity;

characterized in that the method comprises, prior to these requests, a notification, by the manager entity of the application service, of a consumption forecast by the application service of at least one network service provided by the network services manager entity to the network services manager entity.

The notification sent by the application service manager entity to the network services manager entity makes it possible to inform the latter of the consumption forecast in terms of network services by the application service. A cooperation between client entities of the virtualized-resources manager entity is thus made possible upon the expression by the latter of their respective needs in terms of execution resources. The network services manager entity is in particular able, by virtue of this notification, to anticipate its own needs in terms of execution resources. The method thus allows the network services manager entity to characterize the trend of its need in terms of execution resources to execute the network services on which the application service relies.

The method also allows the application service manager entity to express its need in terms of execution resources to the virtualized-resources manager entity by taking account of the satisfaction of the requests for allocation of execution resources from the network services manager entity.

The cooperation between client entities of the virtualized-resources manager entity in particular makes it possible to avoid having the execution resources monopolized unnecessarily by a single client entity. This is particularly advantageous in the execution of mutually interdependent services. In the absence of cooperation, the client entity first making its request for allocation of execution resources is served first with no account taken of the resource allocation requests sent by other entities. Such a situation can rapidly be reflected by a shortage of execution resources for these other entities.

Returning to the example given previously in the introduction of an electricity consumption reading application service of an electricity provider depending on network services for the reading of electricity meters, the method allows a cooperation between the electricity consumption reading service and the network services for the management of the distribution of the execution resources between services, and thus makes it possible to avoid a degradation of service, even a service interruption. The quality of service is thus improved.

According to a particular feature, the notification by the manager entity of the application service further comprises at least one intermediate consumption level indicating an intermediate consumption lower than the consumption forecast, the first request for execution resources comprising at least one level of execution resources corresponding to said at least one intermediate consumption level.

The presence of one or more intermediate consumption levels in the notification of a consumption forecast allows the application service manager entity to offer different fallback solutions to the network services manager entity, when the network services cannot meet the needs expressed by the future consumption. These intermediate consumption levels thus make it possible to rapidly converge (by dichotomy for example) to an acceptable need in terms of network services by the network services manager entity.

In case of an insufficiency of execution resources for the application service and the network services, it is thus possible to invoke the virtualized-resources manager entity for it to allocate a lesser volume of execution resources than that required by the consumption forecast of the application service that nevertheless makes it possible to use the execution resources in the most efficient way possible.

According to a particular feature, the notification by the manager entity of the application service further comprises at least one intermediate consumption level indicating an intermediate consumption lower than the consumption forecast, the first request for execution resources being followed, when it is not satisfied, by successive requests for execution resources corresponding to the intermediate consumption levels, until one of said successive requests is satisfied.

According to a particular feature, the method further comprises, in response to the first request for execution resources, a notification of the consumption in terms of network services accepted by the network services manager entity to the application service manager entity prior to the second request for execution resources, the second request being a function of said reserved execution resources.

The notification of reservation of execution resources allows the application service manager entity to adapt its request for allocation of execution resources as a function of the execution resources actually reserved by the virtualized-resources manager entity for the execution of network services.

It is thus possible for the application service manager entity to adjust its request in terms of execution resources in order to request a lesser volume of execution resources than that necessary for an initially consumption forecast. A more efficient management of the resources in order to optimize the quality of service is thus made possible.

According to a particular feature, the method further comprises, when the notification of the accepted consumption in terms of network services indicates that the first request for execution resources is unsatisfied, a placement of the second request for resources on hold.

In the case where the virtualized-resources manager entity is no longer able to allocate any execution resource both to the application service manager entity and to the network services manager entity, the application service manager entity is also informed. The latter can then defer its request for execution resources, which avoids overloading the network traffic by the sending of a request which cannot be satisfied.

According to a particular feature, the method further comprises, when the notification of accepted consumption in terms of network services indicates that the first request for execution resources is unsatisfied, a request from the application service manager entity to the virtualized-resources manager entity for a reservation of storage resources, the storage resources corresponding to an estimated volume of data to be transmitted by the network services manager entity to the application service manager entity after the execution of said at least one network service, the execution of the application service being deferred.

In case of shortage of execution resources, the method advantageously makes it possible to reserve storage resources and thus create a buffer zone in which data to be processed are stored until execution resources are available again. The network services that are considered higher priority than the application service are then processed first, the data deriving from this processing being stored in the storage resources reserved for this purpose. Then, in a second stage, when the execution resources used by the network services are freed up, they can be allocated for the execution of the application service, that is a lower priority because it is dependent on the network services. The method thus makes it possible to provide an application service even when the environment is strongly constrained in terms of execution resources.

According to a second aspect, the invention relates to an application service manager entity providing an application service whose execution depends on a concurrent execution of at least one network service by a network services manager entity, comprising:

- a sending/receiving module arranged to send a notification of a consumption forecast by the application service of said at least one network service to the network services manager entity, and to receive from this network services manager entity a notification of the consumption in terms of network services accepted by the latter;
- a sending module arranged to send a request for allocation of execution resources to the virtualized-resources manager entity and a request for allocation of storage resources.

According to a particular feature, the application service manager entity further comprises a timer module activated when the reservation notification indicates that a request for allocation of execution resources by the network services manager entity is unsatisfied, and arranged to place a request for allocation of execution resources from the application service manager on hold.

According to a third aspect, the invention relates to a network services manager entity, providing at least one network service, for the execution of an application service by an application service management entity. The network services manager entity comprises:

- a sending/receiving module arranged to receive a notification, from the application service manager entity, of a consumption forecast by the application service of said at least one network service, and to send to the application service manager entity a notification of the consumption in terms of network services accepted by the network services manager entity for the execution of said at least one network service;
- a sending module arranged to send a request for allocation of the execution resources for the execution of said at least one network service to a virtualized-resources manager entity.

According to a fourth aspect, the invention relates to a system for allocating execution resources, for an execution of an application service and of at least one network service, the execution of the application service depending on the concurrent execution of said at least one network service. The system comprises:

- an application service manager entity, this application service manager entity providing the application service;
- a network services manager entity according to the third aspect, this network services manager entity providing said at least one network service;
- a virtualized-resources manager entity comprising:
   - a reception module arranged to receive a request for allocation of execution resources;
   - an execution resource allocation module arranged to allocate execution resources to the application service manager entity and network services manager entity, as a function of the consumption forecast.

The advantages stated for the allocation method according to the first aspect can be directly transposed to the allocation system according to the fourth aspect.

According to a fifth aspect, the invention relates also to a program comprising program code instructions intended to control the execution of the steps of the method previously described, when said program is executed on a computer, and a computer-readable storage medium on which is stored a computer program comprising program code instructions for the execution of the steps of the method previously described.

The invention will be better understood from the following description of particular embodiments, with reference to the attached drawings in which:

DETAILED DESCRIPTION OF ILLUSTRATIVE EMBODIMENTS

Figure 1:
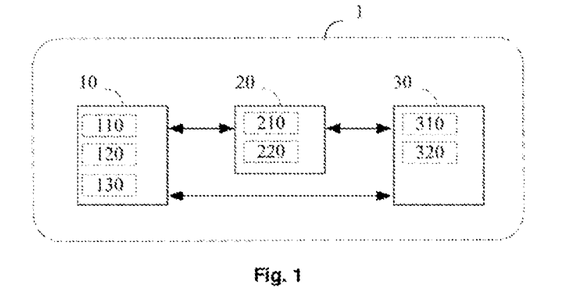
FIG. 1 represents a system for allocating execution resources according to a particular embodiment.

FIG. 1 represents a system 1 for allocating execution resources according to a particular embodiment. The system 1 comprises an application service manager entity 10, a network services manager entity 20, and a virtualized-resources manager entity 30. The system 1 makes it possible in particular to allocate execution resources for a concurrent execution of an application service and of at least one network service. Execution resources should be understood to be the computation and storage resources, as well as the resources that allow the network interconnection within a cloud infrastructure.

The application service manager entity 10 is, by way of example, a server of an electricity provider offering an electricity consumption reading service. It is assumed in the present embodiment that the network services manager entity 20 and virtualized-resources manager entity 30 are managed by one and the same communication network operator. It is also assumed that the electricity consumption reading service depends on network services implemented by the network services manager 20.

The application service manager entity 10 and the network services manager entity 20 communicate, for example, via a RESTful programming interface. The virtualized-resources manager entity 30 communicates respectively with the application service manager entity 10 and with the network services manager entity 20 via a programming interface.

The virtualized-resources manager entity 30 comprises a reception module 310 arranged to receive requests for allocation of execution resources. The virtualized-resources manager entity 30 further comprises an execution resource allocation module 320 arranged to allocate execution resources to the application service manager entity 10 and network services manager entity 20, as a function of the consumption forecast.

The application service manager entity 10 comprises a sending/receiving module 110 and a sending module 120. The sending/receiving module 110 is arranged to send a notification of a consumption forecast of the network services by the application service to the network services manager entity 20. The sending/receiving module 110 is also arranged to receive from the network services manager entity 20 a notification of the consumption in terms of network services accepted by the latter entity. The sending module 120 is arranged to send a request for allocation of execution resources to the virtualized-resources manager entity 30.

The network services manager entity 20 comprises a sending/receiving module 210 arranged to receive a notification, from the application service manager entity 10, of a consumption forecast of the network services by the application service, and to send to the application service manager entity 10 a notification of reservation of execution resources for the execution of these network services. The network services manager entity 20 also comprises a sending module 220 arranged to send a request for allocation of execution resources for the execution of the network services to the virtualized-resources manager entity 30.

In another embodiment, the module 310 of the virtualized-resources manager entity 30 is arranged to send notifications of execution resources that have become available in order to respond to requests for execution resources which have not previously been able to be satisfied.

In another embodiment, the application service manager entity 10 also comprises a timer module 130 activated when the reservation notification received by the sending/receiving module indicates that a request for allocation of execution resources by the network services manager entity 20 is unsatisfied. This timer module is arranged to place a request for allocation of execution resources from the application service manager 10 on hold.

Figure 2A:
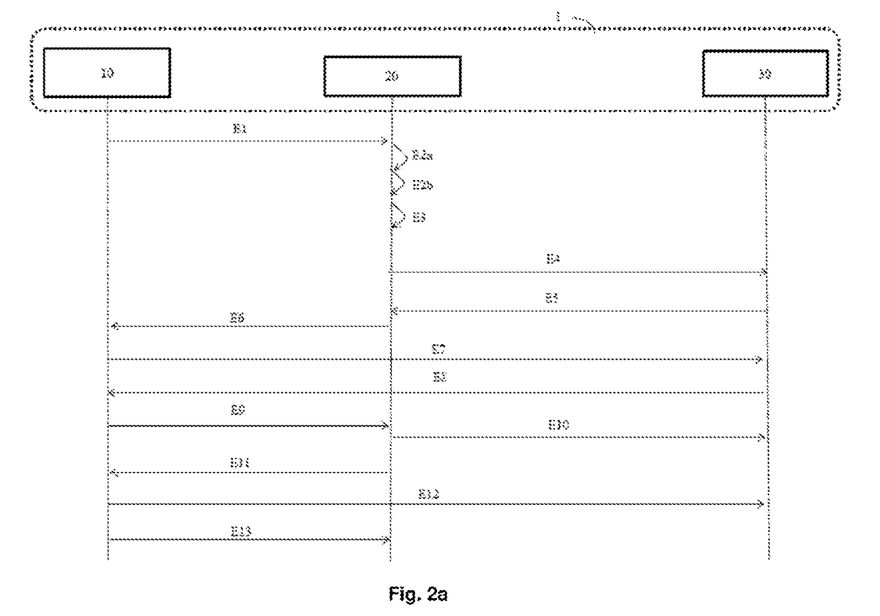
FIGS. 2a and 2b represent a flow diagram of the allocation method, and of the exchanges between equipment items implementing the method, according to two particular embodiments.
Figure 2B:
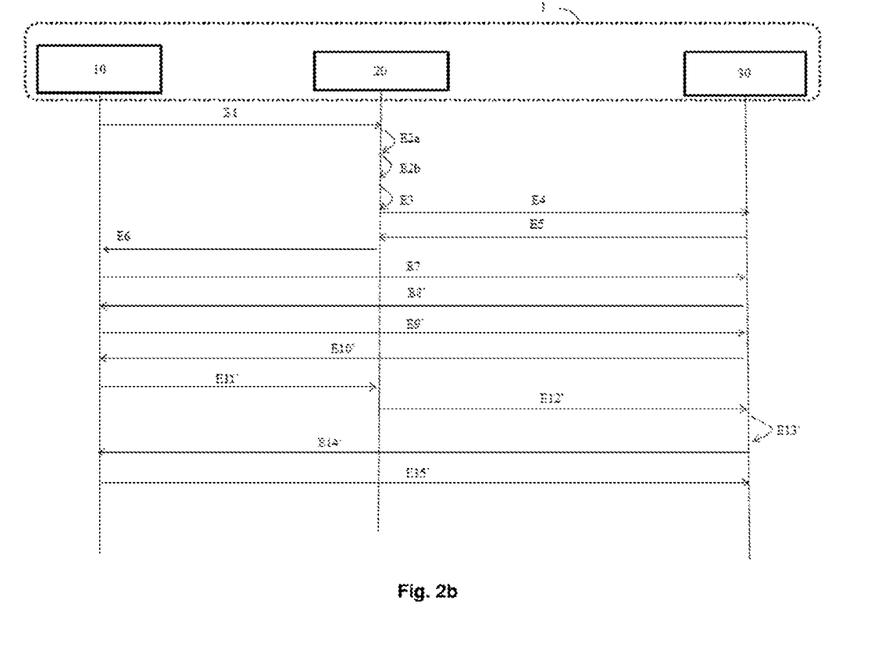

FIGS. 2a and 2b represent a flow diagram of the allocation method, and of the exchanges between equipment items implementing the method, according to two particular embodiments. FIGS. 2a and 2b take up the example introduced previously of an electricity consumption reading application service of an electricity provider depending on network services for the reading of electricity meters provided with sensors capable of connecting to a network of a telecommunications operator. It is assumed that the electricity consumption reading applicating service is provided by an application service manager entity 10, that the network services are provided by a network services manager entity 20, and that a virtualized-resources manager entity 30 is responsible for allocating execution resources to these latter two entities. The application service manager entity 10, network services manager entity 20, and virtualized-resources manager entity 30 form a system which handles the process of allocation of execution resources as previously described in relation to FIG. 1.

FIG. 2a describes a first embodiment in which the application service manager entity 10 cooperates with the network services manager entity 20 by notifying the latter of a consumption forecast in terms of network services by the electricity consumption reading application service.

In a step E1, the application service manager entity 10 notifies the network services manager entity 20 of a consumption forecast by the electricity consumption reading application service of at least one network service provided by the network services manager entity 20. This consumption forecast corresponds for example to an increase in the need in terms of network services for the application service and is expressed as service load C that can be understood by the network service or services. As an example, this load C comprises a volume of data or even a number of connections per second.

In a step E2a, the network services manager entity 20 checks that the consumption forecast is in accordance with a service agreement between the application service manager entity 10 and the network services manager entity 20. For that, the network services manager entity 20 checks, by means of the service agreement, that the consumption forecast in terms of execution resources does not exceed a predefined consumption threshold. The service agreement is for example formalized by a parameterization file stored locally by the network services manager entity 20.

In a step E2b, the network services manager entity 20 determines what virtualized network functions are used by the electricity consumption reading application service.

In a step E3, the network services manager entity 20 determines what execution resources to allocate to satisfy the consumption forecast in terms of network services by the electricity consumption reading application service. More specifically, the network services manager entity 20 determines the virtualized network functions necessary to meet the needs of the application service, and also determines, when such network functions are already implemented, the execution resources already available for each of these functions. This allows the network services manager entity 20 to calculate the execution resources necessary for the consumption forecast in terms of network services by the application service manager entity 10. When no virtualized network function is implemented, the network services manager entity 20 also calculates the execution resources necessary, if appropriate, for the creation of these virtualized network functions. The network services manager entity 20 thus determines, for each virtualized network function necessary for the implementation of the application service, whether or not there is a need to send a request for allocation of execution resources to the virtualized-resources manager entity 30.

In a step E4, the network services manager entity 20 asks the virtualized-resources manager entity 30 to allocate execution resources. This resource request corresponds to the need in terms of resources calculated in the step E3, and is expressed in terms of resources specific to the cloud infrastructure (e.g. computation resources).

In a step E5, the virtualized-resources manager entity 30 sends an acknowledgement message to the network services manager entity 20. This message indicates that the execution resources requested in the step E4 are allocated to the network services on which the application service depends. The virtualized-resources manager entity 30 also triggers a timer at the end of which the execution resources are released if they are not used.

In a step E6, the network services manager entity 20 sends a notification of the consumption in terms of network services accepted by the latter to the application service manager entity 10. This notification relates to the execution resources necessary for the network services.

In a step E7, the application service manager entity 10 sends a request for allocation of execution resources necessary for the application service to the virtualized-resources manager entity 30. This request in particular takes account of the consumption in terms of network services accepted by the network services manager entity 20 in the step E6.

In a step E8, the virtualized-resources manager entity 30 responds positively to the request for allocation of execution resources from the application service manager entity 10. It is stressed that, in the case of a negative response, the application service manager entity 10 can repeat its request for allocation of resources subsequently.

In a step E9, the application service manager entity 10 notifies the network services manager entity 20 that execution resources have been allocated for the electricity consumption reading application service.

In a step E10, the network services manager entity 20 creates the virtualized network functions necessary for the implementation of the network services on which the application service depends.

In a step E11, the network services manager entity 20 notifies the application service manager entity 10 that the virtualized network functions necessary for the implementation of the network services on which the application service depends have been created.

In a step E12, the application service entity 10 implements the electricity consumption reading application service by means of the execution resources which were allocated to it in the step E8.

In a step E13, the application service manager entity 10 notifies the network services manager entity 20 that the increase in the execution resources for the application service is in effect.

In another embodiment, the steps E12 and E13 precede either the steps E9, E10 and E11, or the steps E10 and E11.

In another embodiment, in the step E1, the application service manager entity 10 notifies the network services manager entity 20 of a service identifier. Such an identifier makes it possible in particular to easily identify the service affected by a request for allocation of execution resources in the case where the application service manager entity 10 manages several services.

In another embodiment, in the step E1, the application service manager entity 10 notifies, in addition to the consumption forecast in terms of network services by the application service, at least one intermediate consumption level indicating an intermediate consumption lower than the consumption forecast. These intermediate consumption levels are then repeated in the request for execution resources sent by the network services manager entity 20 in the step E4. The network services manager entity 20 thus transmits them to the virtualized-resources manager entity 30. The intermediate consumption levels are for example transmitted by the network services manager entity 20 in a descending order of desired volumes of resources. In this other embodiment, the notification of reservation of execution resources sent in the step E6 comprises the intermediate consumption level accepted by the virtualized-resources manager entity 30. This notification can also indicate a refusal from the virtualized-resources manager entity 30 to allocate execution resources when the latter entity for example has refused to allocate resources for all of the intermediate consumption levels. The consumption forecast and the intermediate consumption levels are also transmitted via a data structure (e.g. table, matrix, file) having, for example, the following form:

| | Consumption in terms of network services | | |
|---|---|---|---|
| | Consumption forecast | Intermediate consumption 1 | Intermediate consumption 2 |
| Difference in terms of number of simultaneous connections | +1000 | +500 | +100 |
| Difference in terms of number of simultaneous new connections per | +100 | +50 | +10 |

| | Consumption in terms of network services | | |
|---|---|---|---|
| | Consumption forecast | Intermediate consumption 1 | Intermediate consumption 2 |
| time unit Difference in average bit rate per sensor (volume of data per time unit) | 0 | 0 | 0 |
| Difference in peak bit rate per sensor | +50 | +50 | 0 |

In another embodiment in which virtualized network functions are invoked by several distinct application services, the creation of the latter is triggered at the initiative of the network services manager entity 20 without waiting for the notification from the application service manager entity.

FIG. 2*b* describes a second embodiment in which, in case of an insufficiency of execution resources for the application and network services, the application service manager entity 10 maintains a request for execution resources in accordance with a consumption forecast, and requests a storage of the data uploaded via the network services in order for these data to be processed later by the application service manager entity 10. The entities implemented are identical to the entities described in relation to FIG. 2*a*. Similarly, the steps E1 to E7 are once again implemented as described previously in relation to FIG. 2*a*.

Then, in a step E8', the virtualized-resources manager entity 30 places the request for allocation of execution resources sent in the step E7 by the application service manager entity 10 on hold. This placement on hold results for example from an unavailability of the execution resources requested within the cloud infrastructure.

In a step E9', the application service manager entity 10 sends a request for storage resources to the virtualized-resources manager entity 30. The volume of storage resources requested corresponds to an estimated volume of raw data transmitted by the network services. This volume is estimated by the application service manager entity 10 on the basis of the number of sensors (information known to the consumption reading application service) and of the average volume of data uploaded by each sensor.

In a step E10', the virtualized-resources manager entity 30 accepts the request for storage resources and notifies it to the application service manager entity 10.

In a step E11', the application service manager entity 10 notifies the network services manager entity 20 that the cloud infrastructure is ready to receive and to store the data recovered by the network services.

In a step E12', the network services manager entity 20 asks the virtualized-resources manager entity 30 to create the virtualized network functions necessary for the implementation of the network services on which the application service depends.

In a step E13', the virtualized-resources manager entity 30 checks the availability of these execution resources, and determines that the execution resources requested by the application service manager entity 10 in the step E7 are available.

In a step E14', the execution resources requested by the application service manager entity 10 in the step E7 being available, the virtualized-resources manager entity notifies this to the application service manager entity 10.

In a step E15', the application service manager entity 10 asks the virtualized-resources manager entity 30 to implement the electricity consumption reading application service by means of the execution resources requested in the step E7. The execution resources are available and allow the processing of the data stored by the storage resources.

The embodiments previously described in relation to FIGS. 2a and 2b present an electricity consumption reading application service. There is however no limitation as to the type of application service to which the method which is the subject of the invention applies. The method can for example easily be applied to video-surveillance or even augmented reality services.

Although the present disclosure has been described with reference to one or more examples, workers skilled in the art will recognize that changes may be made in form and detail without departing from the scope of the disclosure and/or the appended claims.

The invention claimed is:

1. A method for allocating execution resources, by a virtualized-resources manager entity, for an execution of an application service and of at least one network service, the execution of said application service depending on the concurrent execution of said at least one network service, comprising:
    sending a first request for allocation of execution resources by a network services manager entity of said at least one network service to said virtualized-resources manager entity;
    sending a second request for allocation of execution resources by an application service manager entity of said application service to said virtualized-resources manager entity;
    prior to said first and second requests, the application service manager entity of said application service sending a consumption forecast, by said application service of at least one network service provided by said network services manager entity, to the network services manager entity.

2. The method as claimed in claim 1, in which said notification by the application service manager entity of said application service further comprises at least one intermediate consumption level indicating an intermediate consumption lower than said consumption forecast, said first request for execution resources comprising at least one level of execution resources corresponding to said at least one intermediate consumption level.

3. The method as claimed in claim 1, in which said notification by the application service manager entity of said application service further comprises at least one intermediate consumption level indicating an intermediate consumption lower than said consumption forecast, said first request for execution resources being followed, when it is not satisfied, by successive requests for execution resources corresponding to said intermediate consumption levels, until one of said successive requests is satisfied.

4. The method as claimed in claim 1, comprising, in response to said first request for execution resources, the network services manager entity sending a notification of the consumption in terms of network services accepted by the network services manager entity to the application service manager entity prior to the second request for execution resources, said second request being a function of said reserved execution resources.

5. The method as claimed in claim 4, further comprising, when said notification of the accepted consumption in terms of network services indicates that said first request for execution resources is unsatisfied, placing said second request for resources on hold.

6. The method as claimed in claim 4, further comprising, when said notification of accepted consumption in terms of network service indicates that said first request for execution resources is unsatisfied, sending a request from the application service manager entity to the virtualized-resources manager entity for a reservation of storage resources, said storage resources corresponding to an estimated volume of data to be transmitted by the network services manager entity to the application service manager entity after the execution of said at least one network service, the execution of said application service being deferred.

7. An application service manager entity providing an application service whose execution depends on a concurrent execution of at least one network service by a network services manager entity, the application service manager entity comprising:
    a processor; and
    a non-transitory computer-readable medium comprising instructions stored thereon, which when executed by the processor configure the application service manager entity to perform acts comprising:
        sending a notification of a consumption forecast by said application service of said at least one network service to said network services manager entity;
        receiving from said network services manager entity a notification of the consumption in terms of network services accepted by said network services manager entity for the execution of said at least one network service; and
        sending a request for allocation of execution resources to a virtualized-resources manager entity and a request for allocation of storage resources for an execution of said application service, the execution of said application service depending on the concurrent execution of said at least one network service.

8. The application service manager entity as claimed in claim 7, further comprising a timer module activated when said reservation notification indicates that a request for allocation of execution resources by said network services manager entity is unsatisfied, and arranged to place a request for allocation of execution resources from said application service manager on hold.

9. A network services manager entity, providing at least one network service, for execution of an application service by an application service management entity, the network services manager entity comprising:
    a processor; and
    a non-transitory computer-readable medium comprising instructions stored thereon, which when executed by the processor configure the network services manager entity to perform acts comprising:
        receiving a notification, from said application service manager entity, of a consumption forecast by said application service of said at least one network service;
        sending to said application service manager entity a notification of the consumption in terms of network services accepted by said network services manager entity for the execution of said at least one network service; and
        sending a request for allocation of said execution resources for the execution of said at least one network service to a virtualized-resources manager entity the execution of said application service depending on the concurrent execution of said at least one network service.

10. A non-transitory computer-readable medium comprising program code instructions stored thereon, which when executed by a processor of an application service manager entity configure the application service manager entity to perform acts comprising:
- providing an application service whose execution depends on a concurrent execution of at least one network service by a network services manager entity;
- sending a notification of a consumption forecast by said application service of said at least one network service to said network services manager entity;
- receiving from said network services manager entity a notification of the consumption in terms of network services accepted by said network services manager entity for the execution of said at least one network service; and
- sending a request for allocation of execution resources to a virtualized-resources manager entity and a request for allocation of storage resources for an execution of said application service.

11. A non-transitory computer-readable medium comprising program code instructions stored thereon, which when executed by a processor of a network services manager entity configure the network services manager entity to perform acts comprising:
- providing at least one network service, for execution of an application service by an application service management entity;
- receiving a notification, from said application service manager entity, of a consumption forecast by said application service of said at least one network service;
- sending to said application service manager entity a notification of the consumption in terms of network services accepted by said network services manager entity for the execution of said at least one network service; and
- sending a request for allocation of said execution resources for the execution of said at least one network service to a virtualized-resources manager entity, the execution of said application service depending on the concurrent execution of said at least one network service.

* * * * *